April 18, 1944.     E. L. SCHOFIELD     2,347,002
CONVERTIBLE HEARSE
Filed Aug. 11, 1941     2 Sheets-Sheet 2
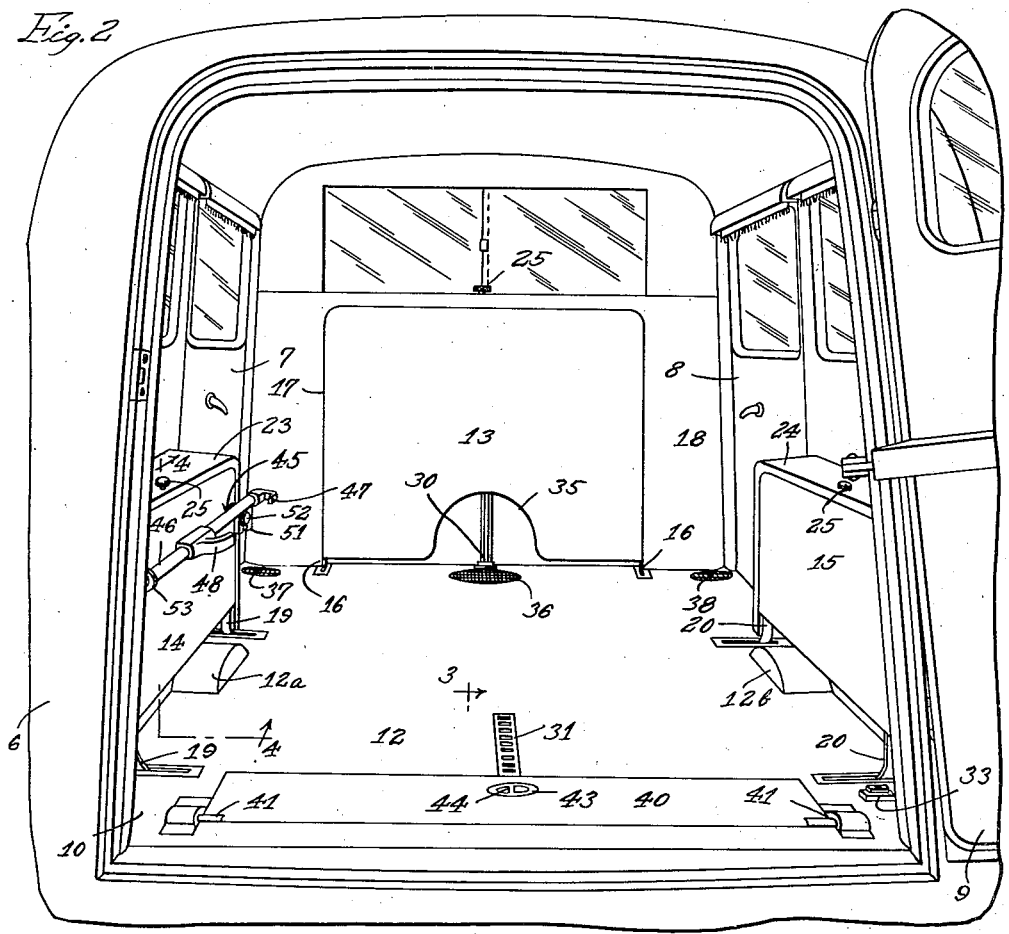
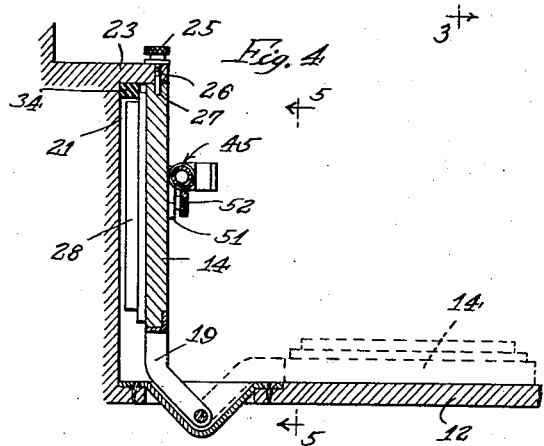
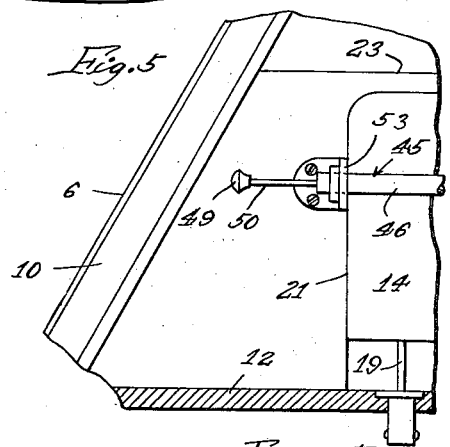
Inventor:
Earl L. Schofield
By McCanna, Wintercorn & Morsbach
Attys.

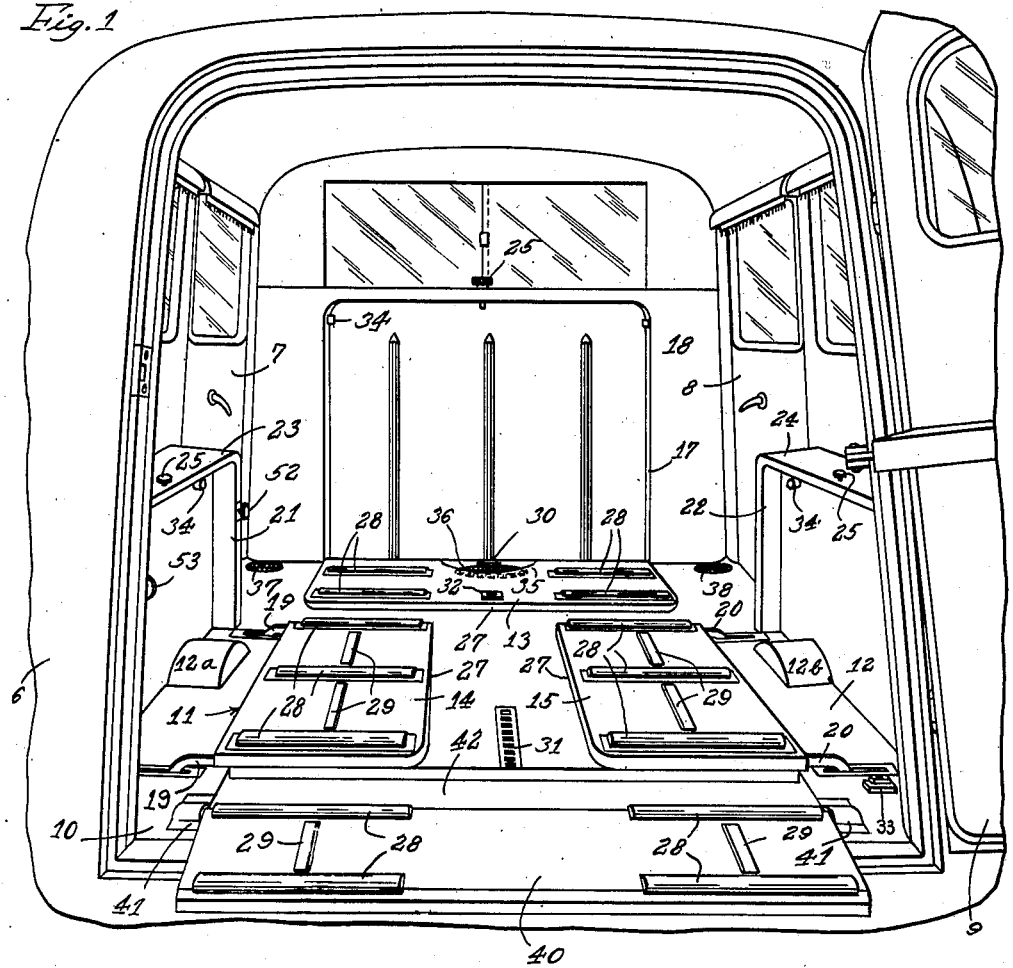

Patented Apr. 18, 1944

2,347,002

UNITED STATES PATENT OFFICE 2,347,002

CONVERTIBLE HEARSE

Earl L. Schofield, Freeport, Ill., assignor to Henney Motor Company, Freeport, Ill., a corporation of Delaware Application August 11, 1941, Serial No. 406,285

9 Claims. (Cl. 296—16)

This invention relates to a hearse convertible to use either as a service car or as an ambulance.

Undertakers in smaller towns find that they cannot afford to purchase and maintain a separate service car and in such cases a convertible hearse fills the need. In many cases it is also of advantage if the vehicle can be converted into use as an ambulance. It is, therefore, the principal object of my invention to provide a vehicle in which the hearse hardware may be quickly and easily concealed and just as quickly and easily replaced in its normal position, so that the same vehicle that is used as a hearse on one occasion is convertible on short notice to use either as a service car or as an ambulance.

A salient feature of the convertible hearse of my invention lies in the provision of a three-section casket rack, there being a front section foldable upwardly to an out-of-the-way position in the back wall of the driver's compartment and two opposed rear sections foldable upwardly into the side walls, suitable means being provided in connection with these foldable sections to secure the same releasably in folded positions. Where the vehicle is to be used as an ambulance, a cot holder may, in accordance with my invention, be mounted detachably on the side wall in transverse relation to the folded rear casket rack section, thus serving to positively retain the rack section in folded position.

Another object of the invention consists in the provision of a convertible hearse of the kind mentioned, wherein an extension rack section is provided unfoldable from the vehicle body to an extended position over the beaver tail extension of the body to facilitate loading and unloading a casket, the extension rack section having rollers thereon, which in the unfolded position of said section are in substantially coplanar relation with the rollers of the other three casket rack sections.

A further object consists in the provision of a foldable extension rack section, which in its folded position constitutes a closure for a storage or sewage disposal compartment in the floor of the vehicle adjacent the rear door opening, the foldable section in closed position lying substantially flush with the floor of the vehicle.

The invention is illustrated in the accompanying drawings, in which—

Figure 1 is a view looking into a convertible hearse through the rear door opening, the hearse embodying the improvements of my invention;

Fig. 2 is a similar view illustrating the vehicle with the hearse hardware concealed;

Fig. 3 is a vertical section in the plane of the line 3—3 of Fig. 2 through the lower rear end portion of the hearse body, showing the foldable extension rack section in full lines in folded position and in dotted lines in unfolded position;

Fig. 4 is a vertical sectional detail on the line 4—4 of Fig. 2, and

Fig. 5 is a sectional detail in a transverse plane to Fig. 4 on the line 5—5 thereof.

The same reference numerals are applied to corresponding parts throughout the views.

The reference numeral 6 designates the body of a hearse having opposed side doors 7 and 8, affording access to the front end of the casket space, and a rear door 9 which when opened permits the loading or unloading of the casket endwise. All three doors will, of course, be usable when the vehicle is being used as a service car or as an ambulance, the cot or stretcher being entered and removed through the rear door opening 10. The casket rack is indicated generally by the reference numeral 11 in Figs. 1 and 3 resting on the floor of the hearse and comprises three sections 13, 14, and 15, the front section 13 being pivoted relative to the floor on hinges indicated at 16 in Fig. 2 to fold into a recess 17 in the back wall 18 of the driver's compartment, the other two rear sections 14 and 15 being pivoted relative to the floor on hinge arms 19 and 20 to fold into recesses 21 and 22 in the side wall compartments 23 and 24, respectively. The hinge arms 19 and 20 are elongated sufficiently so that the rack sections 14 and 15 are supported in folded position in vertically spaced relation to the upwardly projecting rear wheel housings 12a and 12b and also sufficiently to have the outer longitudinal edges of these rack sections longitudinally aligned with the ends of the front rack section 13 when the three rack sections are unfolded to operative positions, as indicated in Fig. 1. Any suitable means may be provided for releasably securing the rack sections 13, 14, and 15 in folded positions, as, for example, screw-in pins, as indicated at 25 in Fig. 4, threaded in holes 26 and entering holes 27 in the edge portions of the foldable rack sections. It is obvious that when the rack sections are folded into the recesses 17, 21, and 22, the plain backs thereof, which are suitably upholstered to match the interior upholstery of the vehicle, show nothing in any way suggestive of hearse hardware. That is to say, the casket rollers 28 and skid plates 29 on the other sides of these rack sections are completely concealed. The only hearse hardware visible when the casket rack sections are folded, as shown in Fig. 2, is the two rather inconspicuous bier pin plates 30 and 31. A third bier pin plate 32 on the inner side of the front rack section 13 will, of course, be concealed when that rack section is folded. The plates 30 and 32 are used interchangeably for mounting the front bier pin, and the plate 31 is used for the rear pin. The rollers 28 being rubber covered to resist sidewise motion of the casket, there is no need for placing bier pins on opposite sides of the casket. The small plate 33 next to the rear door opening 10 provides a convenient receptacle in which the undertaker may place the rear bier pin temporarily before the casket is loaded. Rubber bumper blocks are provided in the three compartments 17, 21, and 22, as indicated at 34, for engagement by the rack sections in folded position so that there will be no danger of these parts rattling when the vehicle is in motion. The front rack section 13 is cut away, as indicated at 35, so as not to cover the ventilator grill 36 in the middle of the floor at the front end of the casket space. Two other ventilator grills are provided in the floor at 37 and 38 at opposite sides of the vehicle. These grills have ducts communicating therewith, and the grill 36 is usually the inlet and the grills 37 and 38 are usually the outlets for heated air in cold weather or cooled air in warm weather. The air conditioning is of course particularly important in connection with the use of the vehicle as an ambulance.

The hearse illustrated is of the type having a beaver tail extension 39 on the rear end thereof terminating in front of the rear bumper (not shown). In accordance with my invention an extension rack section 40, equipped with rollers 28 like those on the other rack sections 13, 14, and 15, is pivotally mounted with respect to the floor 12 in the rear door opening 10 on hinges, indicated at 41, to swing from the full line position shown in Fig. 3, in which the back is flush with the floor 12, to the dotted line position in which the rollers 28, at least the forward ones, are substantially in the same horizontal plane with the rollers 28 on the rack sections 13, 14, and 15. The section 40 in its folded position serves as a closure for a compartment 42 in the floor at the rear end of the hearse, which may be used for storage purposes or as a sewage disposal compartment. The section 40 has a plate 43 on the back thereof with finger holes 44 therein by means of which the section may be raised and swung outwardly to unfolded extended position. When the extension rack section is swung outwardly, it projects far enough out over the beaver tail extension 39 so that there is no difficulty in loading or unloading a casket. The downward inclination of the extension rack section in unfolded position, as indicated in dotted lines in Fig. 3, is of advantage because it brings the rearmost rollers 28 to a lower elevation, thus facilitating the loading and unloading operation. The extension rack section 40 when folded has the back thereof lying flush with the floor, so that there is no interference whatsoever with use of the vehicle as a service car or ambulance.

When all of the rack sections 13, 14, 15, and 40 are folded, as shown in Fig. 2, and the vehicle is to be used as an ambulance, a cot holder, indicated generally by the reference numeral 45, is mounted on the side wall of the vehicle in transverse relation to the rack section 14, and under these circumstances there would really be no need for the pin 25 to secure the rack section in folded position, inasmuch as the cot holder serves to positively retain the rack section in folded position. The cot holder may be of any suitable or preferred construction, the one illustrated comprising an elongated frame member 46 with a hook 47 on the front end and another hook 48 in spaced relation to the rear end for engagement with the front and rear legs on one side of the cot. The cot holder shown forms the subject matter of a copending application of Donald H. Cox, filed June 20, 1942, Serial No. 447,883, and embodies a remote control button 49 on the rear end thereof, easily accessible through the rear door opening 10, for moving the cable 50 in the frame 46 to release a latch member provided on the hook 48, which automatically takes hold of the rear leg of the cot when the cot is moved into position next to the cot holder, the front hook having previously been engaged with the front leg of the cot so that that leg serves as a pivot about which the cot may be swung into position alongside the cot holder. A forked lug 51 is secured to the front end portion of the frame 46 to straddle the shank of a screw 52 on the wall of the compartment 23, whereby to permit quick and easy fastening of the front end of the cot holder. An eyelet 53 is provided on the wall of the compartment 23 to support the cot holder at the rear end thereof, the frame 46 and button 49 being quickly and easily insertible through the eyelet 53 before the lug 51 is applied to the screw 52. In that way the cot holder 45 requires only one screw for its secure fastening and it, therefore, takes very little time to mount or dismount the cot holder.

It is believed the foregoing description conveys a good understanding of the objects and advantages of my invention. The appended claims have been drawn to cover all legitimate modifications and adaptations.

I claim:

1. In a convertible hearse having a floor and side walls, a casket rack pivotally connected to the floor and foldable from a substantially horizontal operative position resting on the floor and held against lateral displacement by its pivots to a substantially vertical inoperative position alongside a side wall of the hearse so as to leave the floor clear for ambulance or other use up to the side wall, said rack being substantially plain on the back that is exposed in the ambulance or other use of the hearse but having casket supporting and conveying means on the face thereof that is exposed in the unconverted use of the hearse, and means for releasably securing the rack in the vertical inoperative position.

2. In a convertible hearse having a floor and side walls, a casket rack comprising a plurality of sections, each of which is pivotally connected to the floor and foldable from a substantially horizontal operative position resting on the floor of the hearse and held against lateral displacement by its pivots to a substantially vertical inoperative position alongside the side walls of said hearse so as to leave the floor clear for ambulance or other use up to the side walls, said rack sections being substantially plain on the back that is exposed in the ambulance or other use of the hearse but having casket supporting and conveying means on the face thereof that is exposed in the unconverted use of the hearse, and means for releasably securing the rack sections in vertical inoperative position.

3. In a hearse adapted to be converted to other use and having a casket space defined by a floor and a substantially vertical front wall and opposed substantially vertical side walls, the hearse having a rear door opening for the casket space, a casket rack comprising three sections, namely, a front section and laterally opposed rear sections, the front section being pivotally mounted on the floor of the hearse to swing forwardly from a substantially horizontal operative position over the floor to a substantially vertical position alongside the front wall, the laterally opposed rear sections each being pivoted relative to the floor to swing laterally from a substantially horizontal operative position over the floor to a substantially inoperative vertical position alongside the adjacent side wall of the hearse, all of said sections being substantially plain on that side which is exposed to the interior of the hearse when the sections are swung upwardly to vertical inoperative position, but having casket supporting and conveying hardware on the other side thereof, and means for releasably securing the several sections in the vertical inoperative position.

4. In a hearse adapted to be converted to other use and having a casket space defined by a floor and a substantially vertical front wall and opposed substantially vertical side walls, the hearse having a rear door opening for the casket space, a casket rack comprising three sections, namely, a front section and laterally opposed rear sections, the front section being pivotally mounted on the floor of the hearse to swing forwardly from a substantially horizontal operative position over the floor to a substantially vertical position alongside the front wall, the laterally opposed rear sections each being pivoted relative to the floor to swing laterally from a substantially horizontal operative position over the floor to a substantially inoperative vertical position alongside the adjacent side wall of the hearse, all of said sections being substantially plain on that side which is exposed to the interior of the hearse when the sections are swung upwardly to vertical inoperative position, but having casket supporting and conveying hardware on the other side thereof, means for releasably securing the several sections in the inoperative position, and a rear extension rack section pivoted to the floor adjacent the rear door opening to fold from a substantially horizontal inoperative position extending forwardly from the rear door opening to a substantially horizontal operative position over the floor extending rearwardly through the rear door opening, the top surface of the rear extension rack section being substantially plain and lying substantially flush with the floor in the inoperative position of said rack section, the other side of the extension rack section having casket supporting and conveying hardware thereon and in the extended operative position of said rack section being substantially in coplanar relation with the top of the other rack sections in their operative positions.

5. A hearse as set forth in claim 4, including a storage compartment in the floor of the hearse adjacent the rear door opening, the extension rack section in its folded inoperative position serving as a closure for the open top of said compartment.

6. In a hearse adapted to be converted to other use, the hearse comprising a floor and side walls, the side walls having recesses provided therein to accommodate casket rack sections, a concealable casket rack for the floor of the hearse comprising separate rack sections having plain backs, the casket rack sections being made to fit in said wall recesses, means for detachably securing each of said rack sections in the recesses in the side walls of the hearse so that only the plain backs thereof are exposed, casket supporting and conveying anti-friction rollers mounted on the fronts of said sections so as to be concealed from view in the side walls of the hearse when said rack sections are disposed in said recesses, and means for releasably holding each of said rack sections in a predetermined operative relationship to the other rack sections while they are resting flatly on the hearse floor with the rollers all disposed substantially in the same horizontal plane for rolling support of a casket.

7. In a hearse adapted to be converted to other use, a concealable casket rack for the floor of the hearse comprising separate rack sections having plain backs, means for detachably securing each of said rack sections to the side walls of the hearse so that only the plain backs thereof are exposed, casket supporting and conveying anti-friction rollers mounted on the fronts of said sections so as to be concealed from view in the side walls of the hearse, means for releasably holding each of said rack sections in a predetermined operative relationship to the other rack sections on the hearse floor, and an extension rack section also having a plain back but carrying casket supporting and conveying anti-friction rollers on the other face thereof, said extension rack section being movable from an inverted position inside the hearse with the rollers thereon concealed to an operative position extending rearwardly from the hearse with the rollers thereon disposed in approximately the same horizontal plane with the rollers of the other rack sections in their operative positions on the floor of the hearse.

8. In a convertible vehicle of the class described, comprising a floor and a side wall, a panel member foldable from a horizontal position over the floor to a substantially vertical position alongside the side wall, the panel member being substantially plain on the back but carrying casket supporting and conveying hardware on the face thereof which is concealed when the panel member is in the vertical position, and a cot holder demountably attachable to the side wall in transverse relation to the back of said panel in the vertical position thereof, the cot holder retaining the panel member against displacement from the vertical position and also being adapted to detachably secure a cot in position on the floor next to the side wall and panel member.

9. A hearse as set forth in claim 7, including a storage compartment in the floor of the hearse adjacent the rear door opening, the extension rack section in its inverted position inside hearse serving as a closure for the open top of said compartment.

EARL L. SCHOFIELD.